United States Patent [19]

Miyazaki et al.

[11] 4,126,887
[45] Nov. 21, 1978

[54] METHOD OF CONTROLLING ROTARY MEMORY

[75] Inventors: Michio Miyazaki; Masafumi Nozawa, both of Odawara, Japan

[73] Assignee: Hitachi, Ltd., Japan

[21] Appl. No.: 715,153

[22] Filed: Aug. 17, 1976

[30] Foreign Application Priority Data

Sep. 12, 1975 [JP] Japan .................................. 50-110060
Sep. 12, 1975 [JP] Japan .................................. 50-110061

[51] Int. Cl.$^2$ ................................................ G11B 5/09
[52] U.S. Cl. ........................................ 360/49; 360/48
[58] Field of Search ..................... 360/47, 48, 49, 72

[56] References Cited

U.S. PATENT DOCUMENTS

| 3,258,754 | 6/1966 | Gabor | 360/48 |
| 3,623,039 | 11/1971 | Barham | 360/49 |
| 3,765,005 | 10/1973 | Cannon | 360/48 |

*Primary Examiner*—Vincent P. Canney
*Attorney, Agent, or Firm*—Craig & Antonelli

[57] ABSTRACT

A method of controlling a rotary memory for preventing failure to read a recorded information block during reading of the contents of the memory. In the method, a second marker is provided separately from a first marker representing the starting point of each recorded information block so as to achieve the desired missing-free read control of the rotary memory.

2 Claims, 6 Drawing Figures

METHOD OF CONTROLLING ROTARY MEMORY

BACKGROUND OF THE INVENTION

1. Field of the Invention

This invention relates to the read control of memories, and more particularly to a method of controlling a rotary memory such as a magnetic drum storage or magnetic disk storage.

2. Description of the Prior Art

A recording format as shown in FIG. 1 has heretofore been employed in a rotary memory, for example, a magnetic disk storage. Referring to FIG. 1, each individual track includes a plurality of information blocks R, and each of these blocks R comprises an address marker AM, a count area C, a key area K and a data area D arranged in the described order with a gap G interposed therebetween. The address marker AM represents the starting point of the block R, and the key area K represents the kind of data recorded in the data area D.

In the prior art format shown in FIG. 1, the presence of in information block R is detected when an address marker AM provided in the starting point of this block R is detected. When such an address marker AM is not detected within a predetermined searching range, this indicates either of the following two cases. In one case, no address marker AM is detected because no information block R that should follow an address marker AM is present; while in the other case, such address marker AM is not detected due to a failure of a control unit to properly detect the address marker AM during reading.

According to a prior art flow chart as shown in FIG. 4, the address marker searching operation proceeds, under control of a control unit, to the next one, thence to the end of a specific track, when no address marker AM is detected within a predetermined searching range. When no address marker AM is detected in spite of the searching operation which is continued to the end of the specific track, the control unit decides that the preceding information block R is the final one of the specific track and is not followed by any additional blocks R, and the reading operation is normal. When, on the other hand, an address marker AM is detected in the course of the searching operation which is continued to the end of the specific track, the control unit decides that the reading operation has merely failed to detect the address marker AM. This failure to detect an address marker AM is called a missing AM operation hereinafter. Upon decision that there has occured missing AM operation, the memory is controlled so that the missing record can be read. However, according to the prior art method of determining a missing AM operation, the address marker searching operation which is continued to the end of a specific track would not detect any address marker AM in the case in which the missed information block R is the final one of the specific track. Therefore, the prior art control method has been defective in that the control unit decides that the reading operation is normal in such a case, and that the failure to detect the AM marker results from the fact that there is no information block present.

SUMMARY OF THE INVENTION

It is a primary object of the present invention to provide a novel and improved method of controlling a rotary memory for ensuring accurate detection of a missing AM operation in any one of the records in a track thereby preventing missing of any one of the records during reading.

In accordance with the present invention, there is provided a method of controlling a rotary memory on which there is recorded a plurality of sequentially accessible information blocks, each including a first marker recorded in a gap preceding an address part to represent the starting point of the information block, said method comprising recording a second marker independently of said first marker in another gap succeeding the address part of a block, and deciding that a specific block is present or absent depending on whether said second marker is detected or not when said first marker is not detected in the course of reading.

DESCRIPTION OF THE PREFERRED EMBODIMENTS

A preferred embodiment of the control method according to the present invention will be described with reference to FIGS. 2 and 5. In this embodiment, a recording format in a magnetic disk storage includes a second marker in each information block in addition to a first marker, and a control unit decides that a block is present when the second marker therein is detected in spite of failure to detect the first marker.

Figure 1:
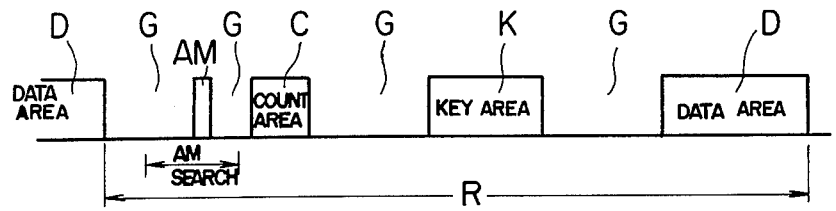
FIG. 1 shows a recording format employed heretofore in a magnetic disk storage.

FIGS. 2a and 2b show a recording format according to the first embodiment of the present invention, and like reference characters are used therein to denote like parts appearing in FIG. 1. More precisely, FIG. 2a represents an intermediate portion of a track including a recorded information block R, and FIG. 2b represents a record-free region of the track following the final block R. As in FIG. 1, each block R in a track of a magnetic disk storage comprises an address marker AM, a count area C, a key area K and a data area D arranged in the described order with a gap G interposed therebetween. The count area C and the key area K represent an address of the block R and the kind of data recorded in the data area D, respectively. However, the format shown in FIGS. 2a and 2b differs from that shown in FIG. 1 in that another marker BM, which is called hereinafter a block marker, is interposed in the gap G between the count area C and the key area K.

Figure 2:
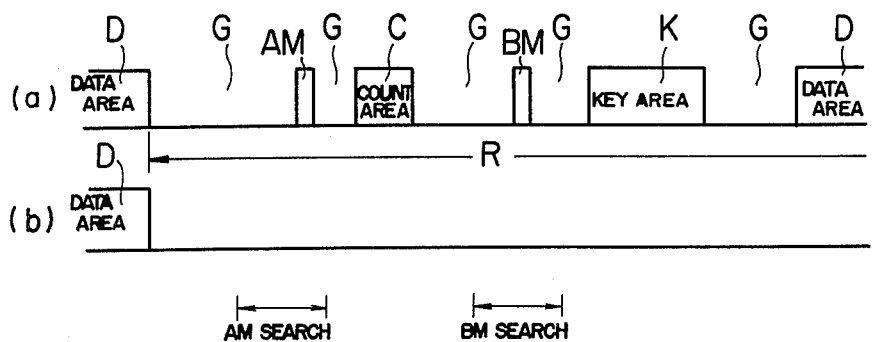
FIG. 2 shows a recording format according to an embodiment of the present invention.
Figure 5:
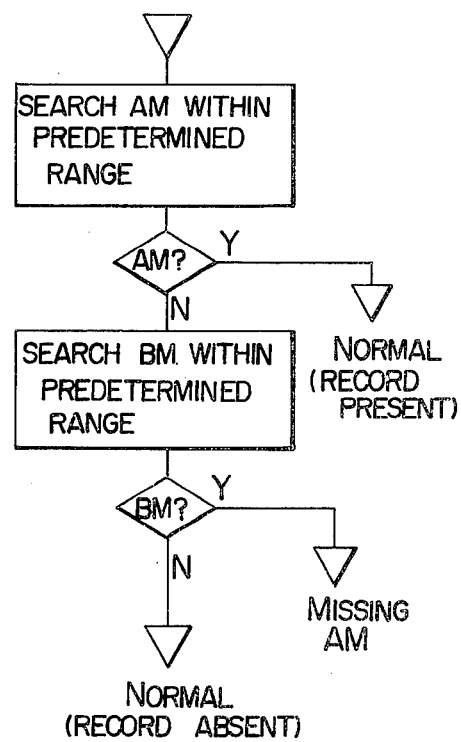
FIG. 5 is a flow chart used for detecting a missing AM operation during reading records recorded according to the format shown in FIG. 2.

Referring to FIG. 5 showing a flow chart for detecting missing AM during reading of the information blocks R recorded according to the format shown in FIG. 2, an address marker AM in a block R is searched within a predetermined range under control of a control unit to detect the presence of this block R, and when the searching operation fails to detect the address marker AM, the block marker BM in the same information block R is then searched within another predetermined range. The control unit decides that the address marker AM is missed when the block marker BM is detected during the searching operation. When no block marker BM is detected, the control unit decides that the preceding block R is the final one of the track and is not followed by any record, and the reading operation is normal.

According to the first embodiment of the control method of the present invention, a corresponding block marker BM following an address marker AM in an information block R can necessarily be detected with a very great possibility even when a missing AM operation occurs, since the probability of missing both the address marker AM and the block marker BM in the same block R is very little or is nearly negligible. Therefore, occurrence of a missing AM operation during reading of the records track can be positively detected and missing of any one of the information blocks can be reliably prevented by detecting the presence of the address marker AM, and/or the block marker BM.

The length of the gap G between the count area C and the key area K in each information block R cannot be reduced beyond a certain limit due to the fact that the memory must communicate with a channel during reading of the information recorded in the count area C and key area K. However, the memory need not communicate with the channel during detection of the block marker BM. Thus, the block marker BM can be recorded in the existing gap G between the count area C and the key area K, in each block R.

A second embodiment of the control method according to the present invention will be described with reference to FIGS. 3 and 6. In this second embodiment, a recording format in a magnetic disk storage includes similarly a second marker in addition to a first marker, and a control unit determines that an information block is present when the second marker is not detected after unsuccessful detection of the first marker.

FIGS. 3a and 3b show a recording format according to the second embodiment of the present invention, and like reference characters are used therein to denote like parts appearing in FIG. 1. More precisely, FIG. 3a represents an intermediate portion of a track including an information block R, and FIG. 3b represents a record-free region of the track following the final block R. As in FIG. 1, each block R in a track of a magnetic disk storage comprises an address marker AM, a count area C, a key area K and a data area D arranged in the described order with a gap G interposed therebetween. However, the format shown in FIGS. 3a and 3b differs from that shown in FIG. 1 in that another marker BM, which is called hereinafter a block marker, is recorded in a record-free region following the final block R at a position corresponding to the gap G between the count area C and the key area K in the intermediate block R shown in FIG. 3a.

Figure 3:
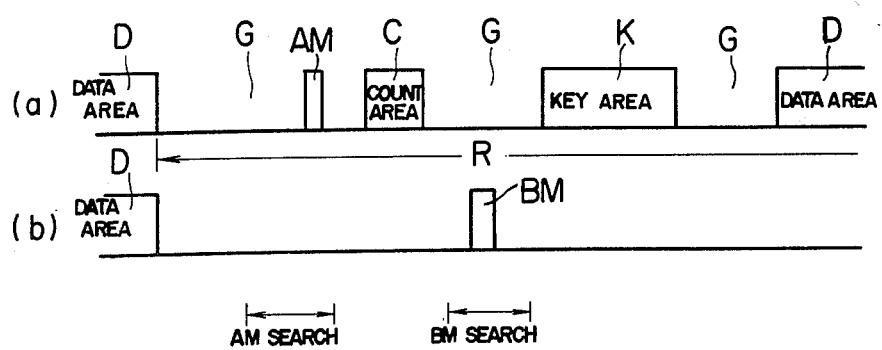
FIG. 3 shows a recording format according to another embodiment of the present invention.
Figure 6:
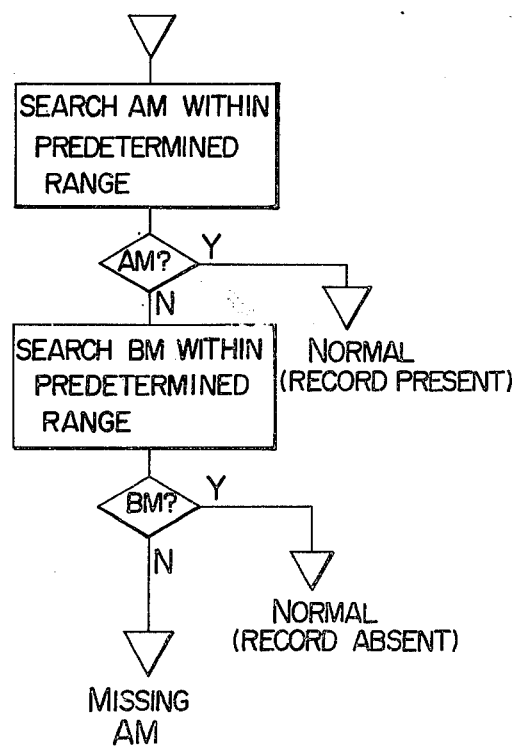
FIG. 6 is a flow chart used for detecting a missing AM operation during reading information blocks recorded according to the format shown in FIG. 3.

Referring to FIG. 6 showing a flow chart for detecting a missing AM operation during reading of the records information blocks recorded according to the format shown in FIG. 3, an address marker AM in a block R is searched within a predetermined range under control of a control unit to detect the presence of a block R, and when the searching operation fails to detect the address marker AM, the block marker BM is then searched within another predetermined range. The control unit decides that the address marker AM is missed when the block marker BM is not detected during searching within the above range. When the block marker BM is finally detected, the control unit decides that the information block R read immediately before the detection of the block marker BM is the final one of the track and is not followed by another block, and the reading operation is normal.

According to the second embodiment of the control method of the present invention, there is little possibility of detecting the block marker BM after occurrence of a missing AM operation due to failure to detect an address marker AM, since the probability of missing the address marker AM and yet detecting a noise signal or like spurious signal as the block marker BM is very little or is nearly negligible.

Therefore, occurrence of a missing AM operation during reading of the track can be positively detected, and missing of any one of the information blocks can be reliably prevented by detecting the presence and absence of the address marker AM and block marker BM.

It will be understood from the foregoing description that the present invention is remarkably advantageous over the prior art method in that occurrence of missing AM can be positively detected during reading the information blocks along a track of a rotary memory, and missing of any one of the information blocks can be reliably prevented.

Figure 4:
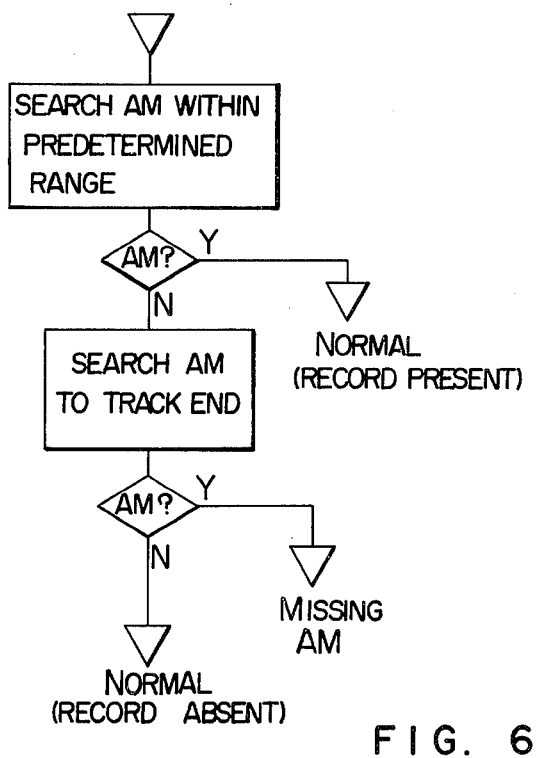
FIG. 4 is a flow chart used heretofore for detecting a missing AM operation.

According to the prior art control method described with reference to FIGS. 1 and 4, missing of an address marker AM in a block R in a track of a rotary memory is not detected until another address marker AM in the succeeding block R is detected. In contradistinction, missing of an address marker AM in a block R in a track of a rotary memory can be detected by detecting the presence or absence of a block marker BM in the same block R, and the channel which controls the rotary memory can be quickly released upon decision of a missing AM operation. Thus, the channel can carry out another kind of data processing operation for a corresponding period of time.

In the aforementioned embodiments of the present invention, the address marker AM is utilized as the first marker. However, the marker indicating the starting point of the count area C in each record may be equally effectively utilized as this first marker. Further, the present invention is equally effectively applicable to a recording format in which no gap G is provided between the address marker AM and the count area C.

We claim:

1. A method of detecting a failure to read a recorded address marker from a rotary memory which includes a plurality of sequentially accessible recording locations each having an address area following said address marker and a data area succeeding said address area, said data area containing a given recorded data which is to be read out when said address marker is detected, said method comprising the steps of:

recording an address marker ahead of said address area and a block marker between said address area and said data area in each of the recording locations;

searching for said address marker in each of said recording locations;

searching for said block marker when said address marker is not detected; and further searching for said undetected address marker of a given recording location when said address marker is not detected but said block marker is detected.

2. A method of detecting a failure to read an address marker from a rotary memory which includes a plurality of sequentially accessible recording locations each having an address area following said address marker and a data area succeeding said address area, said data area containing a given recorded data which is to be read out when said address marker is detected, said method comprising the steps of:

recording an address marker ahead of said address area in each of the recording locations whose data area is recorded with a given data and a block marker in a gap succeeding the final one of said recording locations;

searching for said address marker in each of said recording locations;

effecting sequential access to said recording locations for reading said given data on the basis of detection of said address marker;

searching for said block marker when said address marker is not detected; and further searching for said undetected address marker upon failure to detect said block marker.

* * * * *